Figure 1:
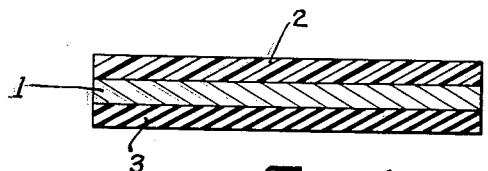

Feb. 14, 1961  H. V. KINDSETH ET AL  2,971,863
PRESSURE SENSITIVE TAPE
Filed March 11, 1957

INVENTORS
HAROLD V. KINDSETH
BY THOMAS B. LUDLOW

ATTORNEYS

United States Patent Office 2,971,863
Patented Feb. 14, 1961

2,971,863

PRESSURE SENSITIVE TAPE

Harold V. Kindseth, Minneapolis, and Thomas B. Ludlow, St. Paul, Minn., assignors to Bemis Bro. Bag Company, Minneapolis, Minn., a corporation of Missouri Filed Mar. 11, 1957, Ser. No. 645,027

23 Claims. (Cl. 117—68.5)

This invention relates to pressure-sensitive adhesive tapes. More particularly, this invention relates to paper backed pressure-sensitive adhesive tapes in which the release and adhesive coating materials are applied to the backing material, without a solvent, by means of a calender.

The calender coating of pressure-sensitive tapes is old in the art but because the adhesives which result from such methods have been in some respects not satisfactory, solvent application is oftentimes preferred. A brief review of the patent literature will quickly verify this. The use of solvents is resorted to in spite of a number of disadvantages.

The use of solvents is expensive, whether the solvents are recovered after coating or whether they are exhausted to the atmosphere. Most solvents for adhesive materials are inflammable in the liquid phase and violently explosive in a range of gaseous mixtures with air or they are toxic. Processing equipment designed to handle solvents safely is complicated and expensive, involving, for instance, specially enclosed electrical equipment, $CO_2$ snuffer systems, explosive limit indicating equipment and the like. Extensive oven facilities are necessary to evaporate off the solvent after coating. This requires, among other things, heat input, and greatly increased manufacturing space requirements. If low viscosity solvent solutions are coated on non-unified or non-saturated backings, the coatings will soak into the backing, requiring vastly more coating to achieve the desired functions of the coatings. Furthermore, this saturation may tend to stiffen the tape backing, thus limiting its utility. The preparation of a solvent solution is also frequently a tedious procedure, while our coatings are ready to coat immediately after a single simple mixing procedure.

The advantages of the use of solvents are: first, that this coating method imposes fewer restrictions on the formulation, processing, and physical properties of the adhesive mass than does a solventless calender coating process, and, secondly, certain desirable characteristics are believed to be imparted to the adhesive coating by the action of the solvent itself. Our product is designed to allow a straight forward, relatively simple compounding and coating operation and yet have the desirable characteristics of a solvent coated tape; namely good tack, and an adhesive bond having high peel and shear strength.

Although the use of pressure-sensitive tapes for multitudinous applications has become well known during the past 20 years and although the art of development of pressure-sensitive tapes for specific applications has been advanced to a high degree, it is nonetheless widely acknowledged that the use of these tapes has been restricted largely to applications in which, usually either by reason of their superior performance or of labor savings made possible, their high cost as compared with water activated gummed tape is economically justified. Their widespread use in highly mechanized industries, such as the packaging industry, for example, has been quite limited because of their high cost, which is necessarily dictated by the complexity of their method of manufacture as well as by the high cost of the raw materials used.

It has been heretofore customary to use as backings for paper backed pressure-sensitive tapes so-called "unified" papers, which in their original form are highly absorbent and of low mechanical strength, but which are saturated or impregnated with various resinous and/or elastomeric materials, such as insolublized glue-glycerin compositions, synthetic rubbers, etc. Many processes have been devised for accomplishing this step, as is well known by those skilled in the art. Among the objects of these "unification" processes are: (1) to prevent delamination of the tape backing when the tape is unwound rapidly, especially after long aging, (2) to prevent delamination of the backing when the tape is removed from a surface after prolonged contact, (3) to prevent subsequent coatings from being absorbed by the paper backing, and (4) to improve solvent resistance, waterproofness, heat resistance, dimensional stability, abrasion resistance, weather resistance, chemical stability, and others.

Therefore, one of the objects of this invention is to provide these desirable characteristics without the use of a costly unifying material in the backing.

Another object of the invention is to provide a low cost pressure-sensitive tape well adapted for wide scale use in the packaging industry.

Still another object is to provide a high quality pressure-sensitive tape having adhesive and release coatings which are free from organic solvents or a water phase at any stage in the formulation.

A further object of our invention is to provide a non-reactive, weather resistant pressure-sensitive tape.

A still further object is to provide pressure-sensitive tapes which will unroll very easily and have no tendency to delaminate upon unrolling.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Figure 2:
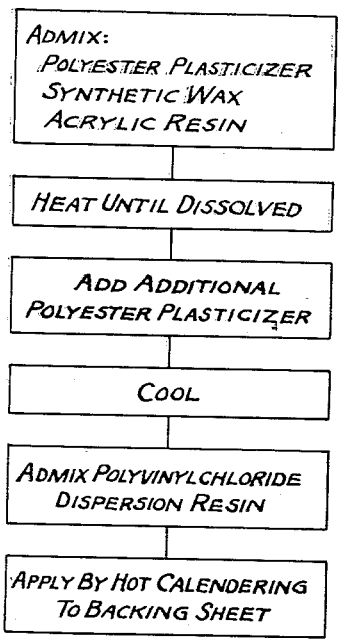
Figure 3:
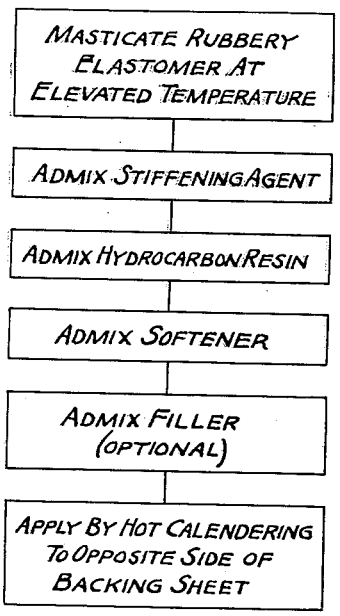

The invention is illustrated diagrammatically in the drawings wherein:

Figure 1 is a schematic enlarged cross section through a portion of a piece of composite pressure sensitive tape according to this invention, the composite tape being composed of a backing sheet 1 having a coating of release material 2 on one side and a coating of pressure sensitive adhesive material 3 on the other;

Figure 2 is a flow diagram showing the preparation and application of the release coating material; and Figure 3 is a flow diagram showing the preparation and application of the pressure sensitive adhesive coating material.

One possible large volume packaging application of the tape of this invention is as a component of a so-called "tape over sewing" closure for multiwall paper bags, wherein the tape is used to render sift proof the sewn closure of such a bag, and render other valuable functions, as is described in our copending United States application Serial No. 569,312, filed March 5, 1956, now abandoned.

Broadly speaking, our novel pressure-sensitive tape (which will be referred to hereinafter by the simple term "tape" unless otherwise indicated) consists, as do most conventional paper backed pressure-sensitive tapes, of three main components: (1) a backing, (2) a release coating on one side of the backing and (3) a pressure-sensitive adhesive coating on the other. By the latter we mean a normally and stably tacky adhesive which will produce a firm, permanent bond to any of a wide variety of substrate materials through the application of contact pressure alone.

Inasmuch as our improved tape embraces major improvements to all three components, as compared with prior art tapes, we prefer to discuss each separately, although it will become apparent that they are closely interrelated, as concerns the structure and function of the finished tape.

THE PAPER BACKING

We have eliminated the normal tendency of a paper tape backing to delaminate when the tape is unrolled vigorously by using a novel pressure-sensitive adhesive coating in conjunction with a highly superior release coating on the back of the tape, so as to reduce unwind tension to a very low level, as hereinafter described. Thus, the internal bond strength of the paper backing, whether creped or uncreped, becomes a relatively unimportant factor, and the customary step, of unifying the paper backing becomes unnecessary, and has been eliminated. Practically speaking, this means that we can produce a pressure-sensitive tape using as a backing any reasonably dense paper, creped or uncreped, by simply coating the release coating of this invention on one side of the paper and the adhesive coating of this invention on the reverse side. Such a tape may be rolled up in the conventional manner and stored under a wide range of ambient conditions for several years without any degradation of its physical properties or usefulness.

From the standpoint of availability, low cost, and optimum physical characteristics, we prefer to use for our tape backings kraft paper, either creped or uncreped, which has been processed during its manufacture such that it will incorporate a low cost rosin size and have a relatively dense fiber structure, as distinguished from so-called saturating papers, which are usually unsized and purposely processed so as to be soft and water absorbent, and are usually less dense and relatively weak as a result. Although the economic advantages of using this preferred general class of kraft paper backings for our tapes are readily apparent to those skilled in the art, this preference by no means limits either the selection of suitable backing materials or the scope of this invention.

Accordingly, we have selected as a backing for our tape, in the tape-over-sewing application, a 30 pound basis weight (based 500—24" x 36" sheets) creped highly rosin sized, natural kraft paper having an uncoated tensile strength of 8 to 10 pounds per inch of width and an ultimate elongation of 10 to 12%. Such a sheet is Mosinee Paper Mills Co.'s Spec. 390 creped kraft, although substantially equivalent sheets may be obtained from other paper manufacturers, as well.

Or, for a pressure-sensitive tape to be used for sealing corrugated boxes, we may select as a backing 40 pound natural rosin sized flat kraft paper, such as is widely available at low cost, and used in great volume in the manufacture of paper multiwall shipping sacks. Although a paper backing is preferred for many uses in the packaging field, for other applications, woven or non-woven fabric, transparent or opaque cellosic or resinous films, such as cellophane, vinyls, and so one, may be used. One form of reinforcing backing of high strength consists of random but generally longitudinally aligned natural or synthetic fibers or filaments having little or no twist to the opposite sides of which the adhesive and release coatings are directly applied.

THE RELEASE COATING

By the term "release coating" we refer to the coating on the side of the backing opposite the pressure-sensitive adhesive coated side. For the purposes of the tapes herein described, a successful release coating must be selected and formulated to perform the following four functions: (1) it must provide a smooth, pinhole-free surface so that during storage of the tape in roll form, there will be no tendency for the pressure-sensitive adhesive contacting said release coating to become mechanically anchored to the release coated surface, (2) it must be formulated such that no ingredient therein will be miscible or reactive with any ingredient in the adhesive coating, (3) it must be of high enough viscosity before coating to avoid saturating a non-unified paper or similar permeable backing, and (4) it must, of course, be of such nature that it will repel the pressure-sensitive adhesive surface, so that the resultant tape can be very easily unwound, even after long aging and/or exposure to ambient conditions of heat, humidity, pressure, and the like, without any tendency of the tape backing to delaminate.

The force necessary to unroll the tape must be greatly less than the force necessary to delaminate the paper backing. Standard tests have been devised to assess these two factors, and may be found in Interim Federal Specification PPP-T-0060 (Navy-Air), "Tape, Pressure Sensitive Adhesive, for Packaging and Sealing," dated February 24, 1955, section on 4.4.5, which describes a testing procedure for determining the unrolling tension of pressure sensitive tapes.

Practically speaking, we have surprisingly found that the unrolling tension obtainable using our improved release coating and pressure-sensitive adhesive coatings, as hereinafter described, is so low that it cannot be reliably determined by the method cited above. It is thus apparent that the internal fiber bond strength of our paper backings may be vastly lower, for the purposes of prevention of delamination during unrolling, than that of prior art tape backings.

We have also found, surprisingly, that this unrolling tension remains about the same regardless of the degree of tack or aggressiveness of the pressure-sensitive adhesive used, as long as the latter conforms to the general specifications set forth below. We have also found that our improved tapes can be wound in large rolls, e.g. 24" outside diameter rolls wound on conventional 3" diameter paper cores, and in spite of the great pressure brought to bear on the surfaces of the tape near the core as a result of winding on successive layers of tape, the tape near the core unwinds as easily, even after prolonged aging, as that near the periphery of the roll.

Because the unrolling tension of our tape cannot be measured by the usual test methods, we have developed a method of our own for measuring this factor, as follows: The end of the roll of tape is attached to a spring scale calibrated in .02 pound increments. The roll is mounted on a low friction bearing. The roll is then unwound by moving it away from the scale at any selected speed. By this means we have found that the release coat used in conjunction with the adhesive composition of Examples V, VI and VII in the Table II has an unrolling tension on the order of from .12 to .20 pound per inch width at an unrolling speed of about 250 feet per minute. The usual masking tape unrolling tension is about one pound to 1.8 pounds per inch at this speed.

Thus, our improved tapes may, for special applications, be supplied in very wide width rolls, e.g. 36" wide, which can be unwound very easily, either manually or by a mechanical dispenser, without any tendency for the tape to unroll unevenly and cause breakage of the web. The importance of this unique feature of our improved tapes cannot be underestimated, especially where high speed automatic operations are involved.

Broadly stated, our release coating is composed of a film forming resin, a plasticizer, a release agent and, optionally, a pigment. As the film forming component it is preferred to use a high molecular weight polyvinyl chloride dispersion resin of which several are commercially available under various brand designations. Such resins are vinyl chloride polymers prepared by emulsion or suspension polymerization which are of such particle size and solution characteristics as to render them useful for the production of vinyl dispersion or plastisol formulations. A preferred polymer is characterized by a specific viscosity of the order of 0.29 when 0.2 gram of resin is dissolved in 100 ml. of nitrobenzene at 68° F. and an average particle size before fusion of less than one micron (Vinylite QYNV). A similar vinyl dispersion resin is available under the trade designation Marvinol VR-50 from the Naugatuck Chemical division of United States Rubber Company.

The plasticizer is a medium molecular weight (about 1200–6000) alkyd type polymeric material based on polybasic acids esterified with dihydric alcohols such as ethylene glycol, propylene glycol, neopentyl glycol and the like, and mixtures thereof. A preferred vinyl plasticizer is a polyester resin based on dicarboxylic acids containing 2 to 10 carbon atoms esterified with dihydric alcohols containing from 2 to 5 carbon atoms, such as, for example, polypropylene glycol adipate (Paraplex G–53), polypropylene glycol sebacate, a condensation product of adipic acid and mixed diglycols such as diethylene glycol and/or dipropylene glycol (Admex 761), or the like. The plasticizer is used in amounts from about 75 to 100 percent by weight of the film forming ingredient. It must be compatible with polyvinyl chloride but must obviously be substantially incompatible with natural rubber, butyl rubber and polyisobutylene, that is, major ingredients of the adhesive coating.

As a release agent there is used a mixture including a hard synthetic waxy substance in combination with a flexible acrylic ester resin. A suitable synthetic wax may be described as a condensation product of a long chain saturated fatty acid containing 16 to 22 carbon atoms with methylene, ethylene, propylene or butylene diamine. Such materials are available by the designation "Acrawax C" from Glyco Products Co., Inc. and "Advawax 280" from Advance Solvents & Chemical Corp. A preferred material is a modified polyamide of stearic acid, such as N,N' ethylene diamine distearamide. The waxy portion of the release agent is used in amounts ranging from about 2 to 8 percent by weight of the film forming ingredient. The resinous component of the release agent may be an acrylic ester resin derived from polymerization of methyl and ethyl esters of acrylic acid and methacrylic acid. A preferred resin is a copolymer of methyl methacrylate and ethyl acrylate (Acryloid B-82). The acrylic ester is present in amounts from about 5 to 15 percent by weight of the film forming ingredient of the release coat.

Pigments may be dispersed in the coating formulation in amounts up to 5 percent of the film forming resin as desired to provide attractive, vividly colored tapes. For example, chrome yellow, phthalocyanine blue, toluidine red and the like and mixtures thereof may be used depending upon the desired color. The release coating may also incorporate a pigment such as titanium dioxide or finely divided aluminum powder, so as to reflect solar radiations, especially in the ultra violet range of the spectrum, which might tend to hasten degradation of tapes exposed to outdoor weathering. If a well dispersed carbon black pigment is added, the coating will tend to absorb incident light of all wave lengths, and thus also prolong the useful life of the tape.

Typical release coating compositions are shown in Table I. Ingredients are shown in parts by weight. Optimum proportions are indicated by an asterisk.

*Table I*

| Example No. | I | II | III | IV |
|---|---|---|---|---|
| Film Forming Resin: | | | | |
| High M.W. polyvinyl chloride dispersion resin— | | | | |
| Vinylite QYNV (100% polyvinyl chloride resin especially prepared for stir-in vinyl plastisol formulation, ultimate particle size less than one micron diameter, fuses into coherent film by baking at 325° to 350° F.; transparent and resists burning; made by Bakelite Company) | 100 | 100 | | 100 |
| Vinylite QYLV (similar to QYNV) | | | 100 | |
| Plasticizer: | | | | |
| Medium M.W. polyester of dicarboxylic acid of 2 to 10 C's and dihydric alcohol of 2 to 5 C's— | | | | |
| Paraplex G—53 (Rohm & Haas Co.) | 75–100 *85 | *85 | *85 | |
| Admex 761 (Archer-Daniels-Midland Co.) | | | | 75–100 *85 |
| Release Agent: | | | | |
| Synethetic wax component— | | | | |
| Acrawax C (Hard brown synthetic wax M.P. 140–142° C., Flash point 233° C. open cup, Sp. gr. 0.975 at 25° C.; Glyco Products Co., Inc.). | 2–8 *5 | 2–8 *5 | 2–8 *5 | 2–8 *5 |
| Arcylic resin component— | | | | |
| Acryloid B-82 (Acrylic ester resin derived from polymerization of methyl and ethyl esters of acrylic acid and methacrylic acid; Sp. gr. about 97; M.P. 118–120° C.; viscosity 40% in toluol of 480–640 c.p.s. at 30° C.; Rohm & Haas Co.). | 5–15 *10 | 5–15 *10 | 5–15 *10 | 5–15 *10 |
| Pigment (Optional): | | | | |
| Titanium dioxide, aluminum powder, carbon black, chrome yellow, phthalocyanine blue, toluidine red, etc. | 0.25–5 | 0.2–5 | 0.2–5 | 0.2–5 |

As will be apparent to those skilled in the art, the above formulations are so-called vinyl plastisols, which may be prepared as follows: Approximately half of the plasticizer is charged into a jacketed mixing vessel and heated to 125° F., with stirring. The release agent components are added slowly, with mixing, to avoid formation of lumps and the batch is heated to 290° F. to 300° F. at which point the latter ingredients will become completely dissolved, resulting in a clear, amber colored solution. Heating is then discontinued and the remaining plasticizer is added rapidly to the heated batch and the whole charge is cooled as rapidly as possible to approximately 75° F. The resultant creamy mixture is strained and may be stored indefinitely.

The polyvinyl resin is added to the premix described above, immediately before coating, using a vertical planetary mixer, such as a so-called Hobart mixer, or any mixing apparatus which will thoroughly mix dough-like materials. This resulting plastisol release coating formulation is then coated onto the paper backing using the coating method described below.

Since vinyl plastisol formulations of the type listed above are of such high viscosity as to prevent coating on conventional knife coating or roll coating equipment, they may best be coated on a conventional vertical three roll calender using roll surface temperatures of 210–220° F. on the top two rolls and 100–125° F. on the bottom roll. The surface speed of the middle and bottom roll are the same. The machine runs at 75–150 feet per minute, web speed.

The release coating is easily applied at coating basis weight range of 5–20 pounds per ream (500 sheets of 24″ x 36″). We have surprisingly found that whereas most vinyl plastisols formulations will gel immediately or even completely fuse to form a tough plastic mass at these coater roll temperatures, the solvency characteristics of the polyvinyl dispersion resin in the polyester plasticizer of the type described are such that our release coating formulation may be maintained at a temperature of 220° F. for several hours, with negligible viscosity increase resulting from solvation of the vinyl resin. Since this release coating formulation has a dough-like consistency at room temperature it is necessary to heat the rolls used to apply the formulation in order to reduce its viscosity to a coatable range. A volatile solvent could also be added to reduce viscosity, of course, but would defeat several of the objects of our invention, as detailed above, most important, that the coating must not permeate the surface of the backing. This solvency characteristic of the polyester plasticizer is, to the best of our knowledge, unique, and obviously of great necessity in the manufacture of our improved tape.

The coated tape backing is immediately fused by passing it under infra red heating units, where the web may attain a momentary temperature of 400 to 450° F., and is immediately passed over a cooling drum. It is then rewound and stored prior to the adhesive coating operation.

The releasing function of the acrylic ester resin-synthetic wax combination in our release coating is unique in that together they display a synergistic effect which gives releasing properties superior to those of a coating containing either alone, and vastly superior to that of a coating containing neither, or, in fact, any so-called release coating of which we have knowledge. It is this unique physico-chemical phenomenon which results in the surprising efficiency of our release coating and which makes the use of non-unified papers for our tape backings possible.

In addition to imparting release properties to our tape backings, this coating also provides resistance to water, most common organic solvents, greases and oils, abrasion and outdoor weathering conditions, as well as significant improvement in tear and tensile strength. Since the unpigmented coating is transparent, it may be coated over previously printed paper to function in part as a so-called overprint varnish, which imparts gloss and visual appeal to the printing. The release coating provides improved liners for adherent rubber surfaces generally.

THE ADHESIVE COATING

The word "pressure-sensitive" has been applied to adhesives having a wide range of physical properties, depending on the end use of the tape, the only requisite being that it adheres by application of pressure alone and is more cohesive than adhesive.

One of the objects of this invention is to provide a composition which will allow achieving a homogeneous compatible mixture of elastomers, resins, and filter without the use of solvent or dispersing or emulsifying agents as has often been done in the past. This was accomplished after a substantial inventive effort.

Broadly stated, the adhesive composition of this invention comprises one or more elastomers, a resin and one or more components from the group consisting of softening agents, fillers and curing or stiffening agents. The elastomer may be either natural rubber or synthetic rubbery polymers and co-polymers composed predominantly of isobutylene. For example, one such material is a commercial synthetic rubbery co-polymer consisting of 97.5 percent isobutylene and 2.5 percent isoprene, and another is a synthetic elastomer consisting of polymers of isobutylene ranging in molecular weight from 100,000 to 300,000 on the Staudinger scale. Compatible elastomers may be used in combination.

The resin component of the adhesive composition is a non-reactive, permanently thermoplastic long chain petroleum hydrocarbon resin compatible with the elastomer. A preferred hydrocarbon resin is the product of polymerization of mixtures of petroleum derived olefinic and dienic monomers of an average molecular weight of 90 and is characterized by a softening point of 70° to 115° C. and an acid number of substantially zero. The resin is present in an amount ranging from about 5 to 70 percent, based on the weight of the elastomer, depending upon the desired tack of the tape. Greater amounts of resin are used where greater tack is desired in the tape and lesser amounts of resin produce a low tack product. Thus, for a high tack product from 50 to 70 percent by weight of resin based upon the weight of elastomer may be used whereas in a low tack tape only 5 to 15 percent of resin may be used.

The softening agent may be either a tacky viscous petroleum based liquid polymer compatible with the elastomer and resin to impart softness, flexibility and tackiness or it may be a petroleum derived oil for the same purpose. A preferred material of the former group is composed of the polymers obtained by catalytic polymerization of normal and branched chain polybutylenes and having a molecular weight of the order of from about 500 to 1500. A preferred oil softener is comprised of approximately 25 percent aromatic and 75 percent paraffinic and naphthenic hydrocarbons having API gravity of 20° to 30° and a viscosity of 70 to 475 Saybolt seconds Universal at 100° F. The softener is used in amounts ranging from zero to 60 percent by weight, based upon the weight of the elastomer. As a general rule the amounts of softener and filler used are interrelated so that as larger quantities of filler are used larger amounts of softener are also required. The softening agents may be used alone or in combination.

The filler is a finely divided mineral substance inert in the adhesive ingredients. It may be, for example, ground limestone, hydrated alumina, clay, zinc oxide or the like. The filler is present in the adhesive composition in amounts ranging up to 165 percent by weight of the elastomeric substance. The fillers may be used alone or in combination. Greater total amounts of filler may be used where a low tack product is desired. In a high tack tape the filler may be present in amounts ranging from 10 to 50 percent by weight of the elastomer.

The adhesive composition preferably contains a chemical curing or stiffening agent for rubbery materials. A typical curing agent is polyparanitroso benzene which is available commercially under the trade name Polyac in a mixture composed of 25 percent polyparanitroso benzene in 75 percent inert carrier such as clay. This commercial curing agent is used in the adhesive in amounts up to about one percent by weight of the elastomer and preferably in amounts from about 0.2 to one percent by weight of the elastomer. Other suitable rubber curing agents include by way of example N-methyl-N-4-dinitroso aniline sold under the trademark "Elastopar" by Monsanto Chemical Co. as a mixture of 33 percent active curing agent and 67 percent inert mineral clay carrier. It is used in the adhesive composition in amounts from about 0.6 to 2.4 parts by weight per 100 parts of elastomer. These curing or stiffening agents aid in vulcanizing butyl rubber when used in combination with sulfur or the like, but when used without sulfur, as specified in this application, they stiffen the mass and reduce cold flow but do not alter the solubility of the rubber in organic solvents, such as normal heptane. They are the preferred curing or stiffening agents. Another curing agent is p-quinonedioxime sold under the designation "GMF" by Naugatuck Chemical Division of U.S. Rubber Co. It is used in the composition in amounts from 1 to 6 parts by weight to each 100 parts of elastomer along with red lead ($Pb_3O_4$) in amounts from 2 to 10 parts by weight to each 100 parts of elastomer. A somewhat similar material from the same source and used in about the same amounts is pp'dibenzoyl quinone-dioxime, sold as "Dibenzo GMF."

Exemplary adhesive compositions are shown in Table II. Components are shown in parts by weight. Optimum amounts are indicated by an asterisk.

Table II can be friction coated on a conventional three roll vertical calender at a speed of 50 to 100 feet per minute with the top two rolls operating at a surface temperature of 280-300° F. and the bottom roll at about 150° F. The adhesives cited in Examples XI and XII will require somewhat higher roll temperatures on the order of 300 to 310° F., since they are somewhat less thermoplastic.

The apparent tack of the tape over stitching tape of Examples V, VI and VII as adjudged by a "finger test" is not particularly great. This is actually highly advantageous for bag sealing applications, in that:

(1) The unrolling tension is very low, resulting in minimum, distortion of the tape as it passes through the applicating machine. The result is a smooth, neater-looking, tighter bag closure.

(2) The tape will not adhere to applicator machine

Table II

| | TOS (Moderate Tack) | | | General Purpose Tapes | | | Low Tack Protective Tapes | |
|---|---|---|---|---|---|---|---|---|
| Example No. | V | VI | VII | VIII | IX | X | XI | XII |
| Elastomer: | | | | | | | | |
| Butyl 218 (synthetic rubbery copolymer comprising 97.5% isobutylene and 2.5% isoprene, Mooney viscosity=75. Enjay Co., Inc.) | 100 | 100 | | 70 | 70 | 70 | 100 | 100 |
| Natural Rubber | | | 100 | | | | | |
| Polyisobutylene MD 333 (synthetic polymer of isobutylene, M.W. 100,000 to 300,000 on Staudinger scale, Enjay Co., Inc.) | | | | 25-35 *30 | 30 | 30 | | |
| Resin: | | | | | | | | |
| Petroleum hydrocarbon resin— Piccopale 100 (thermoplastic methylated paraffinic chain hydrocarbon of petroleum origin, M.P. 100° C., zero acid No., Pennsylvania Industrial Chemical Corp.) | 50-70 *60 | 50-70 *60 | 50-70 *60 | 40-70 *60 | 60 | 60 | 5-15 *10 | 5-15 *10 |
| Softener: | | | | | | | | |
| Hydrocarbon polymer— Polyvis 30 (synthetic hydrocarbon polymer compatible with rubber base adhesives, low M.W. polybutene, M.W. 1,100, Sp. G. 0.9, max. acid No. 1, Flash point 450° F., viscosity S.U. sec. @210° F., 2800, Cosden Petroleum Corp., Big Spring, Texas.) | 50 *37.5 | | | 50 *37.5 | | | 5-20 *10 | |
| Vistac A (similar to Polyvis 30 except M.W. 500, Sp. G. 0.966, Flash point 380° F., Advance Solvents and Chemical Corp.) | | | | 15-50 *30 | 30 | 4.0 | | |
| Petroleum derived oil— Faxam 40 (25% aromatic, 75% paraffinic and naphthenic hydrocarbons, API Gravity 25-30°, viscosity S.U. sec.@100° F., 70 to 475, Esso Standard Oil Co.) | | | | | 20-60 *40 | | 5-20 *10 | |
| Filler: | | | | | | | | |
| Lesamite ($CaCO_3$-powdered ground limestone; particle size 1 to 15 microns; Thompson-Weinman Co.) | 165 | | 165 | | | | | |
| Hydrated Alumina C-730 (Aluminum Co of America; Sp. gr. 2.40; average particle size 0.6-micron) | | | | 10-50 *30 | | | 12.5 5-20 | 12.5 5-20 |
| Zinc oxide—325 mesh and finer | | | | | 10-50 *30 | 10-50 *30 | | |
| Curing agent: | | | | | | | | |
| Polyparadinitroso benzene— Polyac (Polyparanitroso benzene 25% in inert clay 75%, E. I. du Pont de Nemours) | 0.2-1 *0.8 | 0.2-1 | | 0.2-1 *0.8 | 0.2-1 *0.8 | 0.2-1 *0.8 | 0.2-1 *0.8 | 0.2-1 *0.8 |

In order to achieve the optimum adhesive strength, a particular mixing process must be followed. If the elastomer is cured before the resin is mixed in, a low strength heterogeneous dispersion results. However, if the elastomer and resin are intimately dispersed and aged for from several days to a month, the normal stiffening reaction between the curing agent and elastomer is totally inhibited. Thus, Piccopale, normally considered to be a chemically saturated, permanently thermoplastic, non-reactive resin, may actually enter chemically into the cure reaction in some unknown way.

To prepare the adhesive mass, the elastomer component is masticated in a dispersion type double arm internal mixer, the curing agent is added as a 1:5 dispersion with the softener, then the resin is added and the batch is cured at 300° F. for 35 minutes. The remainder of softener and filler is added and the charge is dumped. Total mixing time is about 60 minutes.

The adhesives in the Examples V to X cited above in parts, during stops, or when new tape is being threaded into the machine.

(3) There will be less tendency for the surface of the tape to become contaminated with dust, lint, and other foreign materials frequently encountered in packaging operations.

The apparent deficiency of tack in this particular application is more than compensated for, we were surprised to find, if the tape is applied by means of heavy roller pressure. Furthermore, we have observed that the adhesion "grows" on extended contact with the bag surfaces.

The tape of this invention has resistance to sunlight, moisture, extremes of temperature, outdoor weathering, abrasion, and general conditions of bag use greater than that of the bag itself. We have also observed that it is resistant to alkalies, acids, common organic solvents, oils, and microorganisms, especially as may be introduced by small quantities of powdery materials which may sift through the needle holes of the sewn bag closure and come into contact with the adhesive side of the tape.

One of the most important requirements of the protective tape cited in Examples XI and XII of Table II is that it must be stable and retain its utility over periods up to a year in direct exposure to all manner of outdoor weather conditions. It must have excellent dimensional stability and must not wrinkle, split, or curl. It must be easily removed without delamination of the backing and must not leave any residue on or discolor or in any way mar the substrate surface. We have found that the protective tape made with the adhesive cited in the above example meets these requirements better than any prior art pressure-sensitive tape of which we are aware.

The invention is further illustrated by means of the following example.

EXAMPLE XIII

Preparatory to producing a composite pressure sensitive tape product a batch of release coating material was produced by charging 45 pounds of a poly-basic acid-polyhydric alcohol polyester plasticizer (Paraplex G-53) into a kettle equipped with mechanical stirring means and a steam jacket. The plasticizer was heated with stirring to 150° F. At this point 10 pounds of acrylic ester resin (Acryloid B-82) and 5 pounds of synthetic wax (Acrawax C) were added slowly with continuing agitation to avoid formation of lumps. This mixture was heated up to 300° F. until all of the resin and wax had been dissolved and a clear amber colored solution was obtained. Forty additional pounds of plasticizer were then added. Heating was then discontinued and cold water was circulated in the steam jacket. Agitation was continued while the mixture cooled rapidly to room temperature.

One hundred pounds of vinyl dispersion resin (Vinylite QYNV) were then added to the resultant creamy solution, with mixing, using a vertical planetary mixer. The resin was added slowly to avoid the formation of lumps. The release coating composition formed a smooth dough-like mass which was then applied to one side of a web of a non-unified kraft paper backing on a conventional vertical three roll calender. During the application of the release coating the surface temperatures of the top two rolls of the calender were maintained at about 215° F. and the surface temperature of the bottom roll was about 115° F. The machine was operated at approximately 100 feet per minute web speed. The release coating was applied at the rate of about 15 pounds per ream (500—24" x 36" sheets). The release coating was fused on the paper backing by immediately passing it under infrared heating units where a momentary temperature of the order of 400 to 450° F. was reached and the web was then immediately passed over a cooling drum and rewound prior to application of the adhesive coating.

The adhesive composition was prepared by masticating 82.5 pounds of a 97.5 percent isobutylene-2.5 percent isoprene elastomer (Butyl 218) in a horizontal double arm dispersion type mixer for 10 minutes. The initial temperature of the mixer before charging the elastomer was 200° F. One-half pound of commercial polyparanitroso benzene curing agent (Polyac) was then added to the masticated elastomer and the mixture was allowed to mix for an additional 10 minutes. Fifty pounds of permanently thermoplastic petroleum hydrocarbon resin (Piccopale 100) was then added slowly to the elastomer over a 5 minute period and the mixing was allowed to proceed until a temperature of 280° F. was reached. This higher temperature resulted from the friction and shear of the mixing action and was reached in about 20 minutes. This temperature was sufficient to effect the cure of the elastomer. Thirty-two and a half pounds of a tacky viscous low molecular weight polybutene softening agent (Polyvis 30) and 136 pounds of ground limestone (Lesamite) were added to the elastomer and mixed for 15 minutes at which time they had been uniformly dispersed and the adhesive was ready to be coated.

The adhesive mass was applied to the previously coated paper backing web on the same conventional three roll vertical calender. The calender was operated at a speed of about 75 feet per minute web speed with the top two rolls maintained at a surface temperature of about 280° F. and the bottom roll at about 150° F. The adhesive coating was applied at about 35-55 pounds per ream. The resultant composite pressure sensitive tape was cooled by passing over a chilled roller and rewound. Thereafter the web was unwound, slit and rewound into individual tape rolls.

It is apparent that many modifications and variations of this invention as hereinbefore set forth may be made without departing from the spirit and scope thereof. The specific embodiments described are given by way of example only and the invention is limited only by the terms of the appended claims.

We claim:

1. As a new article of manufacture, a composite pressure sensitive adhesive tape consisting essentially of a backing, a tacky elastomeric pressure sensitive adhesive coating on one side of the backing and a release coating on the opposite side of the backing; said adhesive coating comprising an unvulcanized elastomer selected from the group consisting of natural rubber and polyisobutylene synthetic rubbers, a permanently thermoplastic hydrocarbon resin compatible with said elastomer, said resin being present in the adhesive coating in an amount from about 5 to 70 parts by weight based upon 100 parts of elastomer, and at least one component selected from the group consisting of low molecular weight polybutylene and petroleum oil softeners present in amounts from about 4 to 50 parts by weight to each 100 parts of elastomer, finely divided inert mineral fillers present in amounts from about 5 to 165 parts by weight to each 100 parts of elastomer and rubber curing agents present in amounts from about 0.2 to 1 part by weight to each 100 parts of elastomer; said release coating comprising a polyvinylchloride dispersion resin plasticized with a polyester of a dicarboxylic acid containing from 2 to 10 carbon atoms and a dihydric alcohol containing 2 to 5 carbon atoms, said polyester being present in amounts from about 75 to 100 parts by weight to each 100 parts of dispersion resin and being substantially incompatible with the adhesive coating, and a release agent intimately admixed with said resin and comprising a mixture of a synthetic wax having a melting point of from about 140° to 145° C. and a flexible acrylic ester resin, said release agent being present in amounts from about 2 to 8 parts by weight of synthetic wax and from about 5 to 15 parts by weight of acrylic ester resin to each 100 parts of dispersion resin.

2. A pressure sensitive tape according to claim 1 further characterized in that said hydrocarbon resin is a polymerization product of olefinic and dienic monomers having average molecular weights of about 80 to 100.

3. A pressure sensitive tape according to claim 1 further characterized in that the adhesive coating includes as a softener a polymerization product of normal and branched chain butylenes and having a molecular weight of the order from about 500 to 1500.

4. A pressure sensitive tape according to claim 1 further characterized in that said adhesive coating contains an inert finely divided mineral filler selected from the group consisting of limestone, hydrated alumina, zinc oxide and clay.

5. A pressure sensitive tape according to claim 1 further characterized in that said adhesive coating is unvulcanized and contains as a rubber curing agent a mixture composed of 25 percent polyparadinitroso benzene and 75 percent inert carrier.

6. A pressure sensitive tape according to claim 1 further characterized in that said elastomer is comprised of a rubbery copolymer of 97.5 percent isobutylene and 2.5 percent isoprene.

7. A pressure sensitive tape according to claim 1 further characterized in that said polyvinyl chloride dispersion resin is plasticized with a polyester of a dicarboxylic acid selected from the group consisting of adipic and sebacic acids and a dihydric alcohol selected from the group consisting of ethylene glycol, neo-pentyl glycol and propylene glycol and mixtures thereof.

8. A pressure sensitive tape according to claim 1 further characterized in that said synthetic wax is a modified polyamide of stearic acid.

9. A pressure sensitive tape according to claim 1 further characterized in that said acrylic ester resin is a copolymer of methylmethacrylate and ethyl acrylate.

10. A pressure sensitive tape according to claim 1 further characterized in that a water insoluble pigment is present in said release coating and said pigment is present in amounts from about 0.2 to 5 parts by weight to each 100 parts of dispersion resin.

11. A pressure sensitive tape according to claim 1 further characterized in that said tape backing is a non-unified kraft paper tape.

12. As a new article of manufacture, a composite pressure sensitive adhesive tape consisting essentially of a non-unified kraft paper backing, an unvulcanized thin uniform tacky solvent-free pressure sensitive elastomeric adhesive coating on one side of the paper backing and a thin uniform solvent-free release coating on the opposite side of the paper backing; said adhesive coating comprising an elastomer comprised of a rubbery copolymer of 97.5 percent isobutylene and 2.5 percent isoprene, a permanently thermoplastic hydrocarbon polymer of olefinic and dienic monomers having average molecular weights of about 80 to 100 present in an amount from 5 to 70 parts by weight to each 100 parts of elastomer, a softener comprising a polymerization product of normal and branched chain butylenes and having a molecular weight of the order of about 500 to 1500 present in amounts from about 4 to 50 parts by weight to each 100 parts of elastomer, an inert finely divided mineral filler selected from the group consisting of limestone, hydrated alumina, zinc oxide and clay present in amounts from about 5 to 165 parts by weight to each 100 parts of elastomer and a rubber curing agent composed of 25 percent polyparadinitroso benzene and 75 percent inert carrier present in amounts from about 0.2 to one part by weight to each 100 parts of elastomer; said release coating comprising a high molecular weight polyvinyl chloride dispersion resin plasticized with a polyester of a dicarboxylic acid selected from the group consisting of adipic and sebacic acids and a dihydric alcohol selected from the group consisting of ethylene glycol, neopentyl glycol and propylene glycol and mixtures thereof, said polyester plasticizer being substantially incompatible with the adhesive coating and present in the release coating in amounts from about 75 to 100 parts by weight to each 100 parts of dispersion resin, a release agent intimately admixed with said plasticized resin and comprising a mixture of a modified polyamide of stearic acid synthetic wax having a melting point of about 140° to 145° C. present in amounts from about 2 to 8 parts by weight to each 100 parts of dispersion resin and a flexible acrylic ester resin copolymer of methyl methacrylate and ethyl acrylate present in amounts from about 5 to 15 parts by weight to each 100 parts of dispersion resin, and a water insoluble pigment present in amounts from about 0.2 to 5 parts by weight of dispersion resin.

13. As a new article of manufacture, a composite pressure sensitive adhesive tape consisting essentially of a backing, a tacky unvulcanized elastomeric pressure sensitive adhesive coating on one side of the backing and a release coating on the opposite side of the backing; said release coating comprising a polyvinylchloride dispersion resin plasticized with a polyester of a dicarboxylic acid containing from 2 to 10 carbon atoms and a polyhydric alcohol containing 2 to 5 carbon atoms, said polyester being present in amounts from about 75 to 100 parts by weight to each 100 parts of dispersion resin and being substantially incompatible with the adhesive coating, and a release agent intimately and substantially uniformly admixed with said resin and comprising a mixture of a synthetic wax having a melting point of from about 140° to 145° C. and a flexible acrylic ester resin, said release agent being present in amounts from about 2 to 8 parts by weight of synthetic wax and from about 5 to 15 parts by weight of acrylic ester resin to each 100 parts of dispersion resin.

14. A pressure sensitive tape according to claim 13 further characterized in that said polyvinyl chloride dispersion resin is plasticized with a polyester of a dicarboxylic acid selected from the group consisting of adipic and sebacic acids and a dihydric alcohol selected from the group consisting of ethylene glycol, neo-pentyl glycol and propylene glycol and mixtures thereof.

15. A pressure sensitive tape according to claim 13 further characterized in that a water insoluble pigment is present in said release coating and said pigment is present in amounts from about 0.2 to 5 parts by weight to each 100 parts of dispersion resin.

16. As a new article of manufacture, a composite pressure sensitive adhesive tape consisting essentially of a non-unified kraft paper backing, a thin uniform tacky solvent-free pressure sensitive elastomeric adhesive coating on one side of the paper bracking and a thin uniform solvent-free release coating on the opposite side of the paper backing; said release coating comprising a high molecular weight polyvinyl chloride dispersion resin plasticized with a polyester of a dicarboxylic acid selected from the group consisting of adipic and sebacic acids and a dihydric alcohol selected from the group consisting of ethylene glycol, neopentyl glycol and propylene glycol and mixtures thereof, said polyester plasticizer being substantially incompatible with the adhesive coating and present in the release coating in amounts from about 75 to 100 parts by weight to each 100 parts of dispersion resin, a release agent intimately and substantially uniformly admixed with said plasticized resin and comprising a mixture of a modified polyamide of stearic acid synthetic wax having a melting point of about 140° to 145° C. present in amounts from about 2 to 8 parts by weight to each 100 parts of dispersion resin and a flexible acrylic ester resin copolymer of methyl methacrylate and ethyl acrylate present in amounts from about 5 to 15 parts by weight to each 100 parts of dispersion resin, and a water insoluble pigment present in amounts from about 0.2 to 5 parts by weight of dispersion resin.

17. As a new article of manufacture, a composite pressure sensitive adhesive tape consisting essentially of a non-unified kraft paper backing, a thin uniform tacky unvulcanized solvent-free pressure sensitive elastomeric adhesive coating on one side of the paper backing and a thin uniform solvent-free release coating on the opposite side of the paper backing; said adhesive coating comprising an elastomer comprised of a rubbery copolymer of 97.5 percent isobutylene and 2.5 percent isoprene, a permanently thermoplastic hydrocarbon polymer of olefinic and dienic monomers having average molecular weights of about 80 to 100 present in an amount from 5 to 70 parts by weight to each 100 parts of elastomer, a softener comprising a polymerization product of normal and branched chain butylenes and having a molecular weight of the order of about 500 to 1500 present in amounts from about 4 to 50 parts by weight to each 100 parts of elastomer, an inert finely divided mineral filler selected from the group consisting of limestone, hydrated alumina, zinc oxide and clay present in amounts from about 5 to 165 parts by weight to each 100 parts of elastomer and a rubber curing agent composed of 25 percent polyparadinitroso benzene and 75 percent inert carrier present in amounts from about 0.2 to one part by weight to each 100 parts of elastomer.

18. A pressure sensitive adhesive composition adapted for application in a thin layer to a backing for the production of a solvent-free unvulcanized pressure sensitive adhesive coating, said composition comprising an elastomer comprised of a rubbery copolymer of 97.5 percent isobutylene and 2.5 percent isoprene, a permanently thermoplastic hydrocarbon polymer of olefinic and dienic monomers having average molecular weights of about 80 to 100 present in an amount from 5 to 70 parts by weight to each 100 parts of elastomer, a softener comprising a polymerization product of normal and branched chain butylenes and having a molecular weight of the order of about 500 to 1500 present in amounts from about 4 to 50 parts by weight to each 100 parts of elastomer, an inert finely divided mineral filler selected from the group consisting of limestone, hydrated alumina, zinc oxide and clay present in amounts from about 5 to 165 parts by weight to each 100 parts of elastomer and a rubber curing agent composed of 25 percent polyparadinitroso benzene and 75 percent inert carrier present in amounts from about 0.2 to one part by weight to each 100 parts of elastomer.

19. A composite sheet material comprised of a backing having a coating on at least one side thereof, said coating being relatively poorly adherent to nromally tacky rubbery materials and comprising a polyvinyl chloride dispersion resin plasticized with a polyester of a dicarboxylic acid containing from 2 to 10 carbon atoms and a dihydric alcohol containing 2 to 5 carbon atoms, said polyester being present in amounts from about 75 to 100 parts by weight to each 100 parts of dispersion resin and being substantially incompatible with the elastomer of said rubbery material, and a release agent intimately admixed with said resin and comprising a mixture of a synthetic wax having a melting point of from about 140° to 145° C. and a flexible acrylic ester resin, said release agent being present in amounts from about 2 to 8 parts by weight of synthetic wax and from about 5 to 15 parts by weight of acrylic ester resin to each 100 parts of dispersion resin.

20. A composite sheet material comprised of a backing having a coating on at least one side thereof, said coating being relatively poorly adherent to normally tacky rubbery materials and comprising a high molecular weight polyvinyl chloride dispersion resin plasticized with a polyester of a dicarboxylic acid selected from the group consisting of adipic and sebacic acids and a dihydric alcohol selected from the group consisting of ethylene glycol, neopentyl glycol and propylene glycol and mixtures thereof, said polyester plasticizer being substantially incompatible with the elastomer of said rubbery material and present in the release coating in amounts from about 75 to 100 parts by weight to each 100 parts of dispersion resin, a release agent intimately admixed with said plasticized resin and comprising a mixture of a modified polyamide of stearic acid synthetic wax having a melting point of about 140° to 145° C. present in amounts from about 2 to 8 parts by weight to each 100 parts of dispersion resin and a flexible acrylic ester resin copolymer of methyl methacrylate and ethyl acrylate present in amounts from about 5 to 15 parts by weight to each 100 parts of dispersion resin, and a water insoluble pigment present in amounts from about 0.2 to 5 parts by weight of dispersion resin.

21. A method of making a composite pressure sensitive adhesive tape which comprises the steps of admixing with heating from about 37.5 to 50 parts by weight of a polyester of a dicarboxylic acid containing from 2 to 10 carbon atoms and a dihydric alcohol containing from 2 to 5 carbon atoms, from about 2 to 8 parts by weight of a synthetic wax having a melting point of from about 140° to 145° C. and from about 5 to 15 parts by weight of a flexible acrylic ester resin, heating with mixing until said polyester, wax and resin are dissolved, admixing an additional 37.5 to 50 parts by weight of said polyester and then cooling to room temperature, adding with mixing 100 parts by weight of a polyvinylchloride dispersion resin and applying the resultant composition by hot calendering to one side of a backing sheet, masticating 100 parts by weight of an elastomer selected from the group consisting of natural rubber and synthetic rubbers composed predominantly of polyisobutylene at an elevated temperature, adding from about 0.2 to one part by weight of a rubber curing agent with continued mixing, slowly admixing from about 5 to 70 parts by weight of a permanently thermoplastic hydrocarbon resin compatible with said elastomer with continued heating, admixing from about 4 to 50 parts by weight of at least one component selected from the group consisting of low molecular weight polybutylene and petroleum oil softeners and applying the resultant mixture by hot calendering to the opposite side of said backing sheet.

22. A method of making a composite sheet material which comprises the steps of admixing with heating from about 37.5 to 50 parts by weight of a polyester of a dicarboxylic acid containing from 2 to 10 carbon atoms and a dihydric alcohol containing from 2 to 5 carbon atoms, from about 2 to 8 parts by weight of a synthetic wax having a melting point of from about 140° to 145° C. and from about 5 to 15 parts by weight of a flexible acrylic ester resin, heating with mixing until said polyester, wax and resin are dissolved, admixing an additional 37.5 to 50 parts by weight of said polyester and then cooling to room temperature, adding with mixing 100 parts by weight of a polyvinylchloride dispersion resin, fusing and applying the resultant composition by hot calendering to one side of a backing sheet.

23. A method of making a composite unvulcanized pressure sensitive adhesive sheet material which comprises masticating 100 parts by weight of an elastomer selected from the group consisting of natural rubber and polyisobutylene synthetic rubbers at an elevated temperature, adding from about 0.2 to one part by weight of a rubber curing agent with continued mixing, slowly admixing from about 5 to 70 parts by weight of a permanently thermoplastic hydrocarbon resin compatible with said elastomer with continued heating, admixing from about 4 to 50 parts by weight of at least one component selected from the group consisting of low molecular weight polybutylene and petroleum oil softeners and applying the resultant mixture by hot calendering to one side of a backing sheet.

References Cited in the file of this patent

UNITED STATES PATENTS

| | | |
|---|---|---|
| 2,201,877 | Anderson | May 21, 1940 |
| 2,273,780 | Dittmar | Feb. 17, 1942 |
| 2,311,249 | Powell | Feb. 16, 1943 |
| 2,551,600 | Holland | May 8, 1951 |
| 2,555,062 | Small et al. | May 29, 1951 |
| 2,559,359 | Banks et al. | June 3, 1952 |
| 2,607,711 | Hendricks | Aug. 19, 1952 |
| 2,638,460 | Crouch | May 12, 1953 |
| 2,790,736 | McLaughlin et al. | Apr. 30, 1957 |
| 2,822,290 | Webber | Feb. 4, 1958 |

UNITED STATES PATENT OFFICE
CERTIFICATION OF CORRECTION

Patent No. 2,971,863                                      February 14, 1961

Harold V. Kindseth et al.

It is hereby certified that error appears in the above numbered patent requiring correction and that the said Letters Patent should read as corrected below.

Column 4, line 24, for "4.4.5," read -- 4.5.5, --; column 10, line 74, for "instroduced" read -- introduced --; column 14, line 30, for "bracking" read -- backing --; column 15, line 27, for "nromally" read -- normally --.

Signed and sealed this 18th day of July 1961.

(SEAL)
Attest:

ERNEST W. SWIDER                                                DAVID L. LADD
Attesting Officer                                                 Commissioner of Patents